(12) United States Patent
Erentok et al.

(10) Patent No.: US 10,461,402 B2
(45) Date of Patent: Oct. 29, 2019

(54) MOBILE DEVICE WITH ANTENNA-BOOSTING CASE COUPLING

(71) Applicant: Intel Corporation, Santa Clara, CA (US)

(72) Inventors: Aycan Erentok, Santa Clara, CA (US); Jose Rodrigo Camacho Perez, Guadalajara Jalisco (MX); Brian Girvin, Gilroy, CA (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 15/428,010

(22) Filed: Feb. 8, 2017

(65) Prior Publication Data

US 2018/0226711 A1 Aug. 9, 2018

(51) Int. Cl.
| | | |
|---|---|---|
| H01Q 1/24 | (2006.01) |
| H01Q 1/27 | (2006.01) |
| H01Q 1/48 | (2006.01) |
| H01Q 7/00 | (2006.01) |
| H04B 1/3827 | (2015.01) |
| H04L 29/08 | (2006.01) |
| H01Q 19/22 | (2006.01) |

(52) U.S. Cl.
CPC ............ *H01Q 1/243* (2013.01); *H01Q 1/273* (2013.01); *H01Q 1/48* (2013.01); *H01Q 7/00* (2013.01); *H01Q 19/22* (2013.01); *H04B 1/385* (2013.01); *H04B 1/3833* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 4,894,663 A * | 1/1990 | Urbish | .................. | H01Q 1/243 343/702 |
| 8,922,438 B2 | 12/2014 | Nakano | | |
| 2007/0229376 A1* | 10/2007 | Desclos | ................ | H01Q 1/243 343/718 |
| 2011/0261551 A1* | 10/2011 | Chirila | ............... | G06K 7/10168 361/818 |
| 2012/0056789 A1 | 3/2012 | Sohn | | |
| 2012/0176754 A1* | 7/2012 | Merz | ..................... | H01Q 1/243 361/751 |
| 2018/0070484 A1* | 3/2018 | Mundell | .............. | H05K 9/0024 |
| 2018/0166772 A1* | 6/2018 | Wei | .......................... | H01Q 1/22 |

* cited by examiner

*Primary Examiner* — Trinh V Dinh
(74) *Attorney, Agent, or Firm* — Schwabe, Williamson & Wyatt, P.C.

(57) ABSTRACT

An mobile device may include circuitry for transmissive communication and to operate with a ground reference. An antenna element may be in communication with the circuitry for transmissive communication to transmit or receive transmissive communication. A housing may house the circuitry for transmissive communication and the antenna element and may include a conductive circumferential case element. A coupling device may be electrically coupled to provide the ground reference over an elongate segment of the conductive circumferential case element.

18 Claims, 8 Drawing Sheets

MOBILE DEVICE WITH ANTENNA-BOOSTING CASE COUPLING

TECHNICAL FIELD

The present disclosure relates generally to mobile devices and more particularly to a mobile device with an electrical coupling to a case portion to provide boosted antenna and/or transmissive performance.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Mobile devices, such as mobile telephones, tablet computers, "phablets," wearable devices such as smart watches, Internet of Things (IoT) devices, etc., typically include circuitry for electronic processing and for transmissive communication that may include transmitting and/or receiving signals. Such devices may also include a housing that may contain the circuitry, and may also contain an antenna that may be used in the transmissive communication. Often times, the housing may adversely affect efficiency of transmissive communication and/or the antenna.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
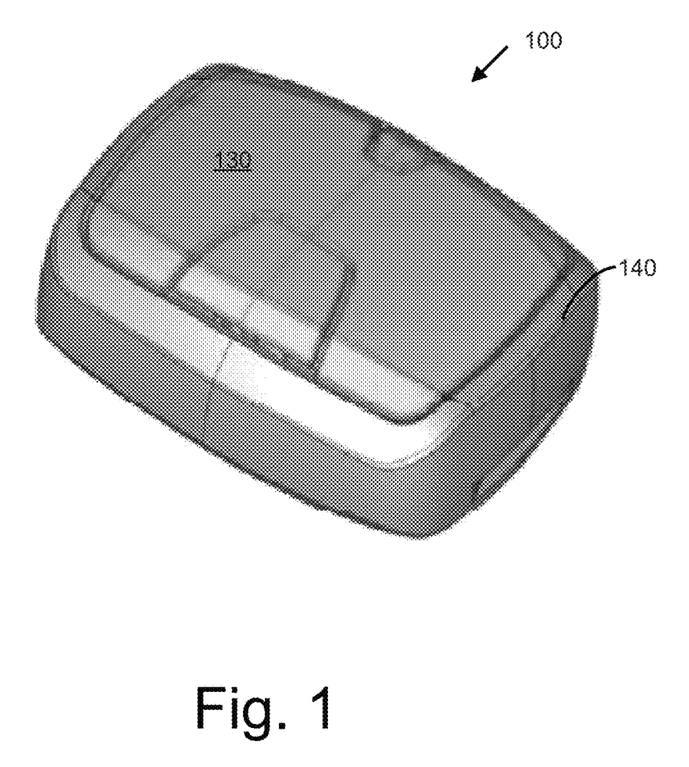
FIG. 1 is an isometric illustration of a mobile device, according to some embodiments.
Figure 2:
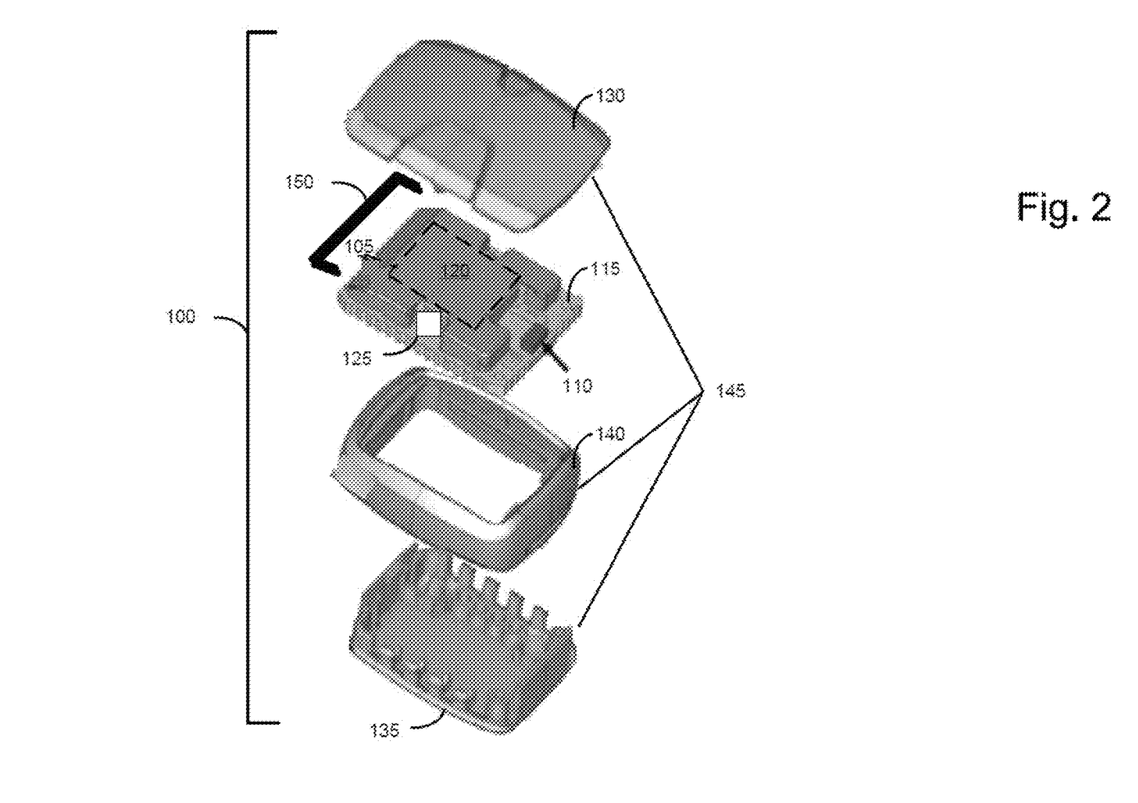
FIG. 2 illustrates an exploded view of some components of the mobile device of FIG. 1.

FIGS. 1 and 2 illustrate a mobile device 100 according to some embodiments, which may include a wearable device, a portable device, and/or an IoT device. According to other embodiments mobile device 100 may include another type of mobile device. With reference to the exploded view of FIG. 2, mobile device 100 may include circuitry 105 (obscured) for electronic processing and that may be in communication with an antenna 110 for transmissive communication by the device 100. The transmissive communication may include transmitting and/or receiving wireless or RF signals. As will be described in more detail below, mobile device 100 may include a coupling device that may provide electrical coupling by which a part of mobile device 100 may be electrically coupled to a main radiation path of antenna 110 and may change excitation currents so as to constructively add in-phase with the main radiation path, thereby to improve far-field radiation performance at an antenna operating frequency.

In embodiments, antenna 110 may include a ceramic lumped antenna or any other type of antenna, which in some embodiments may be or include a standardized or "off-the-shelf" antenna for simplified and/or modular assembly of mobile device 100. The circuitry 105 may be mounted on a circuit board 115 and may be covered and/or enclosed by one or more shields 120 that may provide electromagnetic shielding for the circuitry 105. The circuitry 105 may be powered by a power supply 125 (e.g., a battery) that may or may not be covered and/or enclosed by one or more shields 120 (only one shown).

Mobile device 100 may include a case top 130, a case bottom 135, and a circumferential case element 140 to which case top 130 and case bottom 135 may be attached or connected along their peripheral edges to form a housing 145. In some embodiments, such as embodiments illustrated in FIGS. 1 and 2, circumferential case element 140 may be and/or include an external housing component. In some other embodiments, circumferential case element 140 may be an internal (e.g., frame) element of housing 145. As illustrated in FIGS. 1 and 2, for example, circumferential case element 140 may extend over all the periphery of housing 145. In other embodiments, circumferential case element 140 may extend over only part of the periphery of housing 145 and so, in these embodiments, may not form a closed loop or circumference.

Housing 145 may contain and/or enclose circuitry 105, and may also contain and/or enclose antenna 110, circuit board 115, the one or more shields 120, and power supply 125. According to illustrated embodiments, circumferential case element 140 may have a generally polygonal (e.g., generally quadrilateral) configuration, as illustrated in FIGS. 1 and 2, for example. It will be appreciated, however, that in other embodiments circumferential case element 140 may be of any circumferential configuration, whether generally polygonal, circular, or of any arbitrary shape.

In embodiments, case top 130 and case bottom 135 may be generally nonconductive and may be formed of or substantially include one or more dielectric materials, which may include one or more plastics. Circumferential case element 140 may be generally conductive. In some embodiments, circumferential case element 140 may be formed of or coated with metal or a metallic material. In some other embodiments, one or both of case top 130 and case bottom 135 may support and/or contain an electronic display, which may operate as a touchscreen that may include one or more graphical user inputs. In still other embodiments, one or both of case top 130, case bottom 135, and circumferential case element 140 may support and/or one or more other user inputs, which may include one or more keys, buttons, etc. that may be distinct from and operable separate from touchscreen operation of a display.

The one or more shields 120 may be held to a ground reference or potential to provide electromagnetic shielding for the circuitry 105, such as with respect to transmissive communication via antenna 110. In some embodiments, the one or more shields 120 may be held to a ground reference provided directly by power supply 125 as, for example, a circuit ground. Mobile device 100 may further include a case coupling device 150 (FIG. 2) that may provide an electrical (e.g., galvanic and/or capacitive) coupling or contact between the ground reference and an elongate segment 160 of circumferential case element 140.

Figure 3:
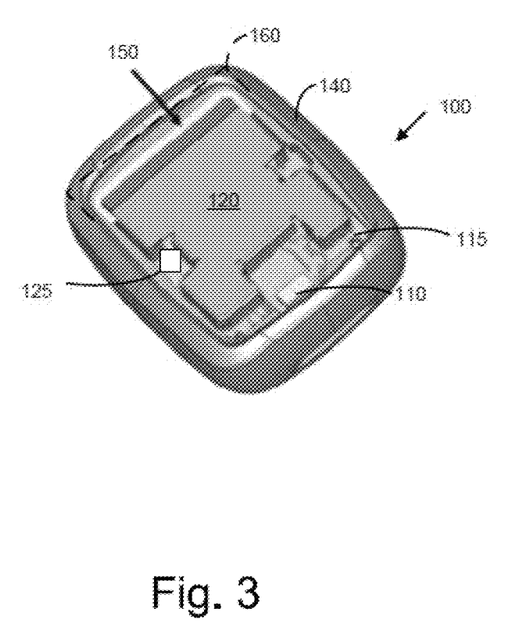
FIG. 3 is a top interior view of the mobile device of FIG. 1, according to some embodiments.
Figure 4:
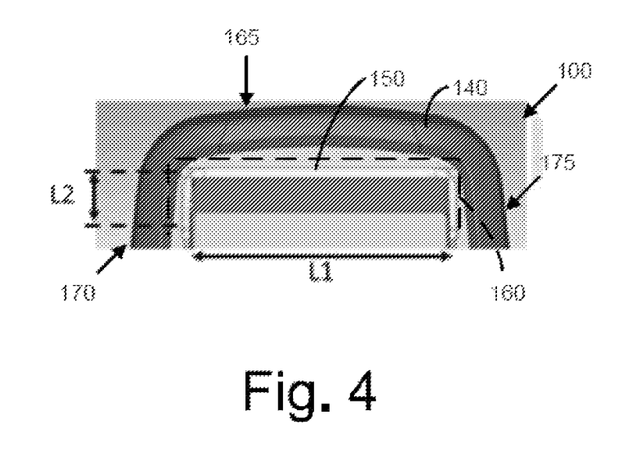
FIG. 4 is an enlarged top plan view of the interior of the mobile device of FIG. 1, according to some embodiments.

FIG. 3 is a top interior view of mobile device 100 illustrating case coupling device 150 with electrical (e.g., galvanic and/or capacitive) coupling or contact along elongate segment 160 of circumferential case element 140 in relation to components of mobile device 100, according to some embodiments. FIG. 4 is an enlarged top plan view of the interior of mobile device 100, according to some embodiments, illustrating case coupling device 150 with electrical contact or coupling along elongate segment 160 of circumferential case element 140. As illustrated in FIG. 4, for example, case coupling device 150 may include electrical contact of a length L1 along a side 165 of circumferential case element 140 and of length L2 along each of sides 170 and 175 of circumferential case element 140. As a result, elongate segment 160 of circumferential case element 140 along which case coupling device 150 may have electrical (e.g., galvanic) contact may be of length L2+L1+L1. According to some embodiments, for example, case coupling device 150 may be connected to the ground reference by electrical and/or galvanic connection to the one or more shields 120. It will be appreciated that case coupling device 150 may be connected to the ground reference by connection other than to shield 120. In some embodiments, coupling device 150 may be connected to a fixed potential or voltage other than the ground reference.

Figure 5:
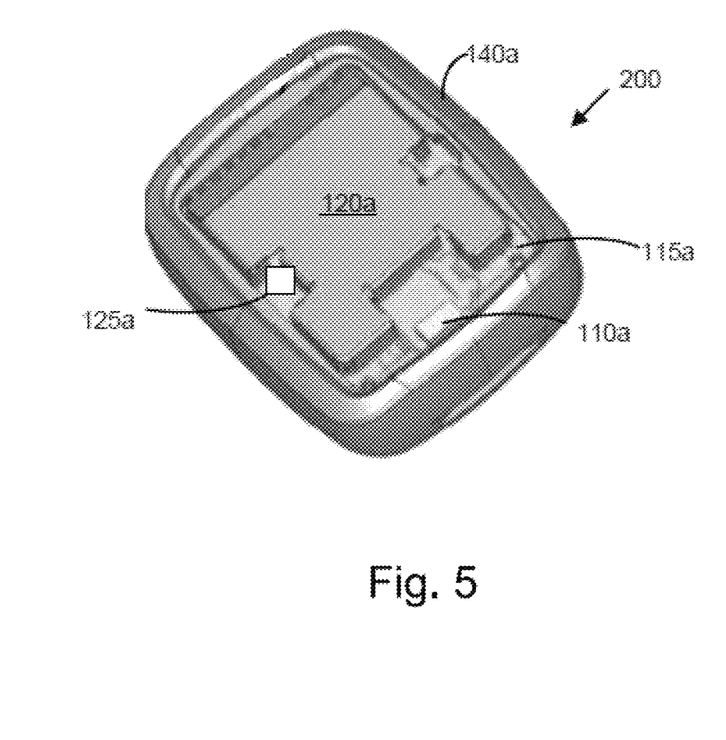
FIG. 5 is a top interior view of a mobile device according to an embodiment without a case coupling, for purposes of illustration.

For purposes of illustration, FIG. 5 is a top interior view of a mobile device 200 according to an embodiment without a case coupling device 150 of mobile device 100. In other regards, mobile device 200 may be substantially similar to mobile device 100 and is indicated to have similar other components, which are indicated by corresponding reference numerals, but are distinguished by the suffix "a." In the absence of case coupling device 150 of mobile device 100, mobile device 200 does not include an elongate segment 160 of circumferential case element 140*a* connected to the reference and/or fixed potential or voltage.

Figure 6A:
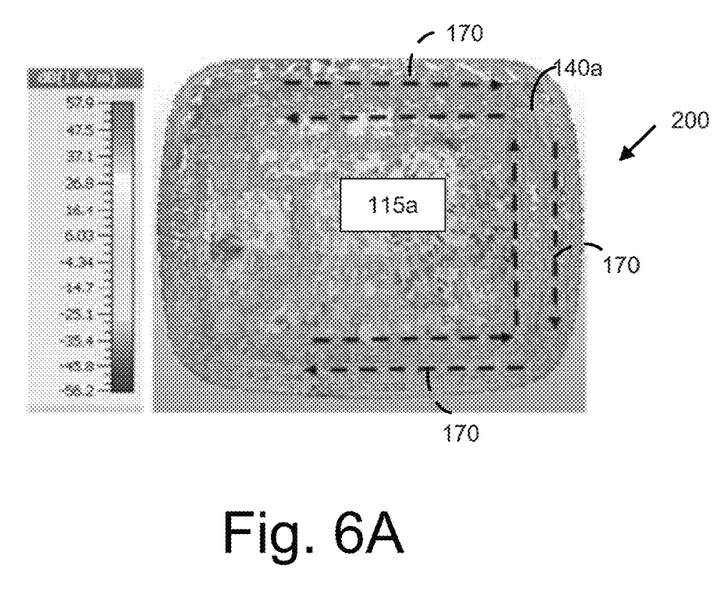
FIGS. 6A and 6B illustrate surface currents that may be induced at least in part in circumferential housing portions by transmissive mobile device operations, according to some embodiments.
Figure 6B:
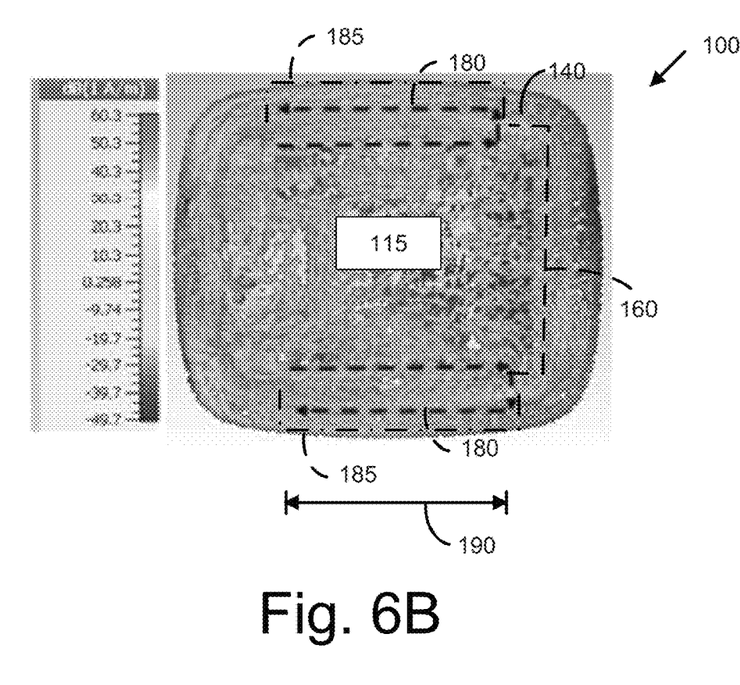

FIGS. 6A and 6B illustrate surface currents that in embodiments may be at 2.44 GHz, for example, and that may be induced in respective circumferential case elements 140*a* and 140, and may also be induced in circuit boards 115*a* and 115, respectively, by transmissive operations of mobile devices 200 and 100, according to some embodiments. For example, FIG. 6A may illustrate surface currents 170 that may be induced in circumferential case element 140*a* and/or circuit board 115*a* of mobile device 200 by transmissive operations, which may include transmitting signals and/or receiving signals. In the absence of case coupling device 150, the continuously conductive circumferential case element 140*a* of mobile device 200 may allow a generally uninterrupted or continuous surface current 170 to be induced in circumferential case element 140*a*. A consequence of the generally uninterrupted or continuous surface current 170 in circumferential case element 140*a* is that it may be out of phase with antenna-excited surface currents on the circuit board. As a result, the generally uninterrupted or continuous surface current 170 in circumferential case element 140*a* may reduce efficiency of antenna 110*a* and/or transmissive operations by mobile device 200.

FIG. 6B may illustrate surface currents 180 that may be induced in circumferential case element 140 of mobile device 100 by transmissive operations, which may include transmitting signals and/or receiving signals. With elongate segment 160 of circumferential case element 140 connected to case coupling device 150 (FIGS. 3 and 4), circumferential case element 140 of mobile device 100 may prevent a generally uninterrupted or continuous surface current, such as generally uninterrupted or continuous surface current 170 (FIG. 6A) in circumferential case element 140*a* of mobile device 200. Instead, surface currents 180 may be induced in segments or portions 185 of circumferential case element 140 that may be separated by elongated segment 160. Segments or portions 185 of circumferential case element 140 may be of selected lengths 190 so that surface currents 180 may be shorter than uninterrupted or continuous surface current 170.

Figure 7:
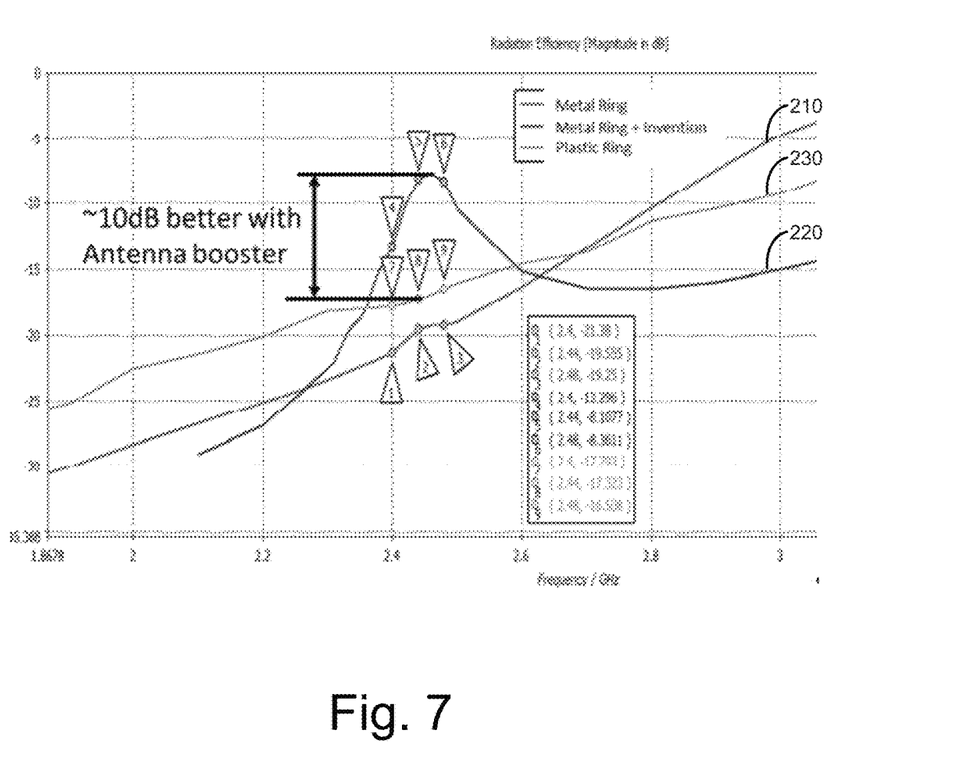
FIG. 7 is a graph illustrating antenna efficiency according to selected embodiments.

In embodiments, a length of elongated segment 160 may be selected so that lengths 190 of segments or portions 185 of circumferential case element 140 may correspond to or result in surface currents 170 that have frequencies and/or wavelengths that may be of or cooperative with transmissive operations of device 100. As a result, surface currents 180 may be in-phase with signals being transmitted and/or received and may increase or "boost" efficiency of antenna 110 and/or transmissive operations by mobile device 100. Accordingly, in embodiments, case coupling device 150 may facilitate surface currents 180 that may increase or "boost" efficiency of antenna 110 and/or transmissive operations of mobile device 100. FIG. 7 is a graph illustrating antenna efficiency according to selected embodiments. The graph of FIG. 7 indicates radiation efficiency as magnitude over a decibel range of about −30 dB to −5 dB for a frequency range of 1.8678 GHz-3 GHz. As examples, a graph 210 that includes data points 1, 2, and 3 may indicate radiation efficiency of a mobile device analogous to mobile device 200, which does not include an elongate segment of circumferential case element 140a connected to the ground reference by a case coupling device 150 (FIGS. 3 and 4). A graph 220 that includes data points 4, 5, and 6 may indicate radiation efficiency of a mobile device analogous to mobile device 100, which may include an elongate segment of circumferential case element 140 connected to the ground reference by a case coupling device 150. For purposes of illustration, a graph 230 that includes data points 7, 8, and 9 may indicate radiation efficiency of a mobile device generally analogous to mobile device 200, but with a circumferential case element that may be generally non-conductive (e.g., of a non-metallic dielectric or plastic material).

Differences between graphs 210 and 230 illustrate a relative decrease in efficiency of up to about 5 dB in transmissive operations by substituting a conductive circumferential case element, such as conductive circumferential case element 140a in mobile device 200, for an analogous non-conductive circumferential case element in an analogous mobile device. Differences between graphs 220 and 210 illustrate a relative increase in efficiency of up to about 10 dB in transmissive operations of mobile device 100 over mobile device 200.

Embodiments described herein, including mobile device 100, may boost overall antenna radiation and/or transmissive performance of a small form factor wireless device, such as a wearable device or an IoT device. In embodiments, antenna 110 may include a reference ceramic antenna that may be employed in low energy Bluetooth communication, for example, even when mobile device 100 includes a conductive (e.g., metal or metallic) circumferential case element 140. In some embodiments, circumferential case element 140 may be formed of metal or metallic material to support selected industrial design considerations, which may relate to appearance and/or durability, for example. Boosting of antenna and/or transmissive operation of mobile device 100 according to some embodiments may, for example, maintain or improve communication range even with circumferential case element 140 formed of a metal or a metallic material.

Embodiments described herein provide flexibility of mechanical enclosure or housing design that may support different industrial design considerations. Embodiments may enhance antenna and/or transmissive operation performance that could be beneficial for some IoT devices. In some embodiments, mobile device 100 may facilitate modular assembly of transmissive components for certain industrial designs and may reduce R&D efforts that can improve time-to-market and related R&D costs. In addition, modular transmissive componentry can enable designers without detailed RF know-how to innovate new products, as RF performance may be built-in as part of mobile device 100.

Improvements may relate to modularity, wherein improvement of overall radiation efficiency may be achieved by addition of a mechanical metal component (e.g., case coupling device 150) that may be a small part of the overall device, but may also be exchangeable for different assembly processes. Other improvements may relate to size, wherein the mechanical metal component (e.g., case coupling device 150) need not increase the size of the host device or require extra space in the host device, but rather may make use of the existing structures, such as use of shield 120 to make ground reference connection. Other improvements may relate to product design, wherein metal industrial design integration may use the same modular approach and thereby support different products (e.g., SKU) using a shared wireless platform. Other improvements may relate to time-to-market, such as by allowing faster time to market by minimizing the R&D effort to design and certify wireless (e.g., antenna) implementations for different material combinations, including metal.

In some embodiments, circuitry 105 and antenna 110 on circuit board 115 may be available as a standard or off-the-shelf "reference board," in which antenna 110 may be a ceramic or printed antenna. Such reference boards may sometimes provide or be used for wireless functionality during early R&D development phases. However, such reference boards and the corresponding reference antennas may be premised on selected electromagnetic (EM) boundary conditions (e.g., only dielectric materials in proximity to the antenna). A new antenna topology may be needed to support an industrial design that may include metals components that may change the EM boundary conditions. In contrast, embodiments described herein may allow reference antennas on reference boards to avoid reduced radiation performance caused by out-of-phase eddy currents induced by metal covers.

Figure 8:
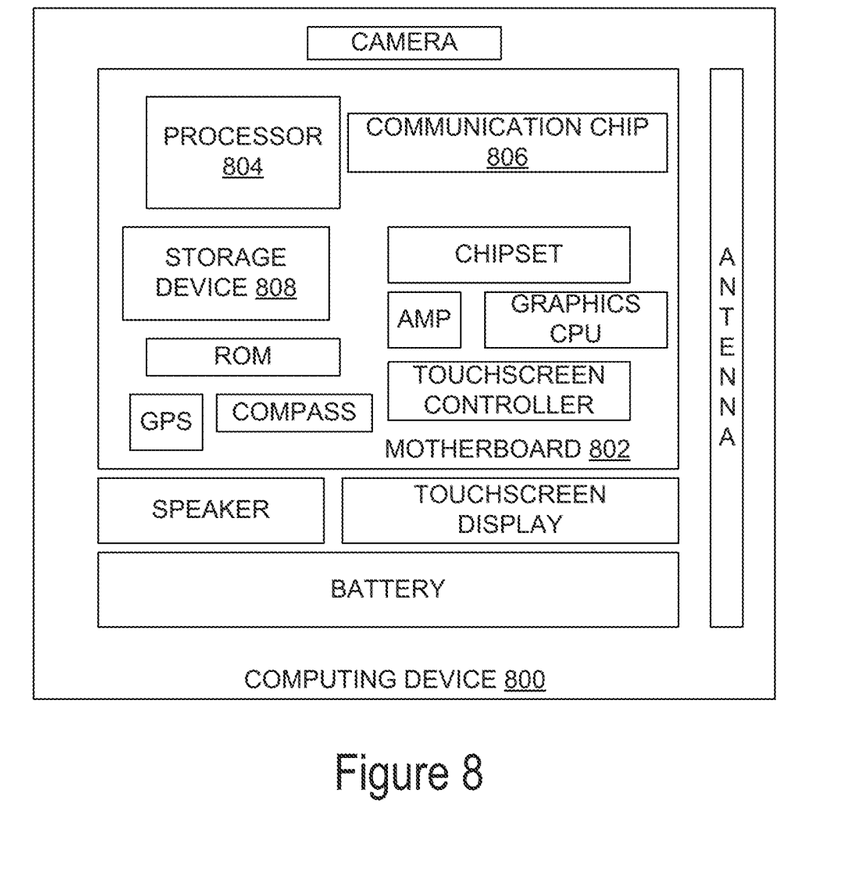
FIG. 8 schematically illustrates a mobile device which, in accordance with some embodiments, may include one or more of a mobile device of FIGS. 1-4.

FIG. 8 schematically illustrates a computing device 800 which, in accordance with some embodiments, may be or include one or more of a mobile device 100. In embodiments, circuitry 105 of device 100 may include one or more elements the computing device 800.

The computing device 800 may be, for example, a mobile communication device. The computing device 800 may house a board such as a motherboard 802. The motherboard 802 may include a number of components, including (but not limited to) a processor 804 and at least one communication chip 806. Any of the components discussed herein with reference to the computing device 800 may be arranged in or thermally coupled with an exposable thermally-conductive panel, as described earlier. In further implementations, the communication chip 806 may be part of the processor 804.

The computing device 800 may include a storage device 808. In some embodiments, the storage device 808 may include one or more solid state drives. Examples of storage devices that may be included in the storage device 808 include volatile memory (e.g., dynamic random access memory (DRAM)), non-volatile memory (e.g., read-only memory, ROM), flash memory, and mass storage devices (such as hard disk drives, compact discs (CDs), digital versatile discs (DVDs), and so forth).

Depending on its applications, the computing device 800 may include other components that may or may not be physically and electrically coupled to the motherboard 802. These other components may include, but are not limited to, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, a Geiger counter, an accelerometer, a gyroscope, a speaker, and a camera.

The communication chip 806 and the antenna may enable wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible broadband wide region (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 806 may operate in accordance with a Global System for Mobile Communications (GSM), General Packet Radio Service (GPRS), Universal Mobile Telecommunications System (UMTS), High Speed Packet Access (HSPA), Evolved HSPA (E-HSPA), or LTE network. The communication chip 806 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 806 may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication chip 806 may operate in accordance with other wireless protocols in other embodiments.

The computing device 800 may include a plurality of communication chips 806. For instance, a first communication chip 806 may be dedicated to shorter range wireless communications such as Wi-Fi and Bluetooth, and a second communication chip 806 may be dedicated to longer range wireless communications such as GPS, EDGE, GPRS, CDMA, WiMAX, LTE, EV-DO, and others. In some embodiments, the communication chip 806 may support wired communications. For example, the computing device 800 may include one or more wired servers.

The processor 804 and/or the communication chip 806 of the computing device 800 may include one or more dies or other components in an IC package. Such an IC package may be coupled with an interposer or another package using any of the techniques disclosed herein. The term "processor" may refer to any device or portion of a device that processes electronic data from registers and/or memory to transform that electronic data into other electronic data that may be stored in registers and/or memory.

In various implementations, the computing device 800 may be a wearable device, a laptop, a netbook, a notebook, an ultrabook, a smartphone, a tablet, a personal digital assistant (PDA), an ultra mobile PC, a mobile phone, a digital camera, a portable music player, or a digital video recorder. In further implementations, the computing device 700 may be any other electronic device that processes data.

Thus various example embodiments of the present disclosure have been described including, but are not limited to:

Example 1 may include a mobile device, which may: circuitry for transmissive communication and to operate with a ground reference; an antenna element in communication with the circuitry for transmissive communication to transmit or receive transmissive communication; a housing that may house the circuitry for transmissive communication and the antenna element and that includes a conductive housing element; and a coupling device electrically coupled to the circuitry to provide the ground reference over an elongate segment of the conductive housing element.

Example 2 may include the mobile device of example 1, wherein the conductive housing element may include a circumferential case element connected to peripheral edges of a case top and a case bottom.

Example 3 may include the mobile device of example 2, wherein the case top and the case bottom may be nonconductive.

Example 4 may include the mobile device of example 2, wherein the circumferential case element may form a closed loop around the peripheral edges of a case top and a case bottom.

Example 5 may include the mobile device of example 2, wherein the elongate segment over which the coupling device is electrically coupled to provide the ground reference to the circumferential case element may provide at least one segment of the circumferential case element that does not receive the ground reference and may have a length that may correspond to a wavelength that is cooperative with transmissive communication by the mobile device.

Example 6 may include the mobile device of example 2, wherein the elongate segment over which the coupling device may be electrically coupled to provide the ground reference to the circumferential case element may provide first and second segments each of which does not receive the ground reference and each of which has a length that corresponds to a wavelength that is cooperative with transmissive communication by the mobile device.

Example 7 may include the mobile device of example 1, wherein the circuitry may be covered by an electromagnetic shield to be coupled to the ground reference and the coupling device is electrically coupled to the electromagnetic shield to receive the ground reference.

Example 8 may include the mobile device of example 1, wherein the ground reference may be a circuit ground.

Example 9 may include the mobile device of example 1, wherein the mobile device may be a wearable device or a portable device.

Example 10 may include the mobile device of example 1, wherein the mobile device may be an Internet of Things (IoT) device.

Example 11 may include an apparatus, which may comprise: circuitry for transmissive communication and to operate with a ground reference; an antenna element in communication with the circuitry for transmissive communication to transmit or receive transmissive communication; a housing that houses the circuitry for transmissive communication and the antenna element and includes a conductive circumferential case element; and a coupling device electrically coupled to the circuitry to provide the ground reference over an elongate segment of the conductive circumferential case element.

Example 12 may include the apparatus of example 11, wherein the conductive circumferential case element may form a closed housing circumference.

Example 13 may include the apparatus of example 12, wherein the conductive circumferential case element may provide external housing.

Example 14 may include the apparatus of example 11, wherein the conductive circumferential case element may be polygonal.

Example 15 may include the apparatus of example 11, wherein the elongate segment over which the coupling device is electrically coupled to provide the ground reference to the conductive circumferential case element may provide at least one segment of the conductive circumferential case element that does not receive the ground reference and may have a length that may correspond to a wavelength that is cooperative with transmissive communication by the mobile device.

Example 16 may include the apparatus of example 11, wherein the elongate segment over which the coupling device is electrically coupled to provide the ground reference to the circumferential case element may provide first and second segments that not receive the ground reference and that each have a length that corresponds to a wavelength that is cooperative with transmissive communication by the mobile device.

Example 17 may include the apparatus of example 11, wherein the circuitry may be covered by an electromagnetic shield to be coupled to the ground reference and the coupling device may be electrically coupled to the electromagnetic shield to receive the ground reference.

Example 18 may include the apparatus of example 11, wherein the apparatus may be a wearable device or a portable device.

Example 19 may include a system, which may comprise: transmissive communication means to provide transmissive communication via an antenna element; housing means to house the transmissive communication means and the antenna element, the housing means including a conductive case element; transmissive boost means electrically associated with the transmissive communication means and the conductive case element of the housing means to boost efficiency of the transmissive communication.

Example 20 may include the system of example 19, wherein the conductive case element may be elongate and the transmissive boost means may include means to provide a ground reference to an elongate segment of the conductive case element.

Example 21 may include the system of example 20, wherein the conductive case element may include a circumferential configuration.

Example 22 may include the system of example 21, wherein the means to provide the ground reference to an elongate segment of the conductive case element further may provide at least one current segment of the conductive circumferential case element with a length that corresponds to a wavelength that is cooperative with transmissive communication by the mobile device, wherein the at least one current segment may not receive the ground reference.

Example 23 may include the system of example 19, wherein the ground reference is a circuit ground.

Example 24 may include a mobile device, which may: circuitry for transmissive communication and to operate with a ground reference; an antenna element in communication with the circuitry for transmissive communication to transmit or receive transmissive communication; a housing that may house the circuitry for transmissive communication and the antenna element and that includes a conductive housing element; and a coupling device electrically coupled to the circuitry to provide the ground reference over an elongate segment of the conductive housing element.

Example 25 may include the mobile device of example 24, wherein the conductive housing element may include a circumferential case element connected to peripheral edges of a case top and a case bottom.

Example 26 may include the mobile device of example 25, wherein the case top and the case bottom may be nonconductive.

Example 27 may include the mobile device of example 25 or 26, wherein the circumferential case element may form a closed loop around the peripheral edges of a case top and a case bottom.

Example 28 may include the mobile device of example 25, wherein the elongate segment over which the coupling device is electrically coupled to provide the ground reference to the circumferential case element may provide at least one segment of the circumferential case element that does not receive the ground reference and may have a length that may correspond to a wavelength that is cooperative with transmissive communication by the mobile device.

Example 29 may include the mobile device of example 25, wherein the elongate segment over which the coupling device may be electrically coupled to provide the ground reference to the circumferential case element may provide first and second segments each of which does not receive the ground reference and each of which has a length that corresponds to a wavelength that is cooperative with transmissive communication by the mobile device.

Example 30 may include the mobile device of any of examples 24-26, 28, or 29, wherein the circuitry may be covered by an electromagnetic shield to be coupled to the ground reference and the coupling device is electrically coupled to the electromagnetic shield to receive the ground reference.

Example 31 may include the mobile device of any of examples 24-26, 28, or 29, wherein the ground reference may be a circuit ground.

Example 32 may include the mobile device of any of examples 24-26, 28, or 29, wherein the mobile device may be a wearable device or a portable device.

Example 33 may include the mobile device of any of examples 24-26, 28, or 29, wherein the mobile device may be an Internet of Things (IoT) device.

Example 34 may include an apparatus, which may comprise: circuitry for transmissive communication and to operate with a ground reference; an antenna element in communication with the circuitry for transmissive communication to transmit or receive transmissive communication; a housing that houses the circuitry for transmissive communication and the antenna element and includes a conductive circumferential case element; and a coupling device electrically coupled to the circuitry to provide the ground reference over an elongate segment of the conductive circumferential case element.

Example 35 may include the apparatus of example 34, wherein the conductive circumferential case element may form a closed housing circumference.

Example 36 may include the apparatus of example 35, wherein the conductive circumferential case element may provide external housing.

Example 37 may include the apparatus of example 34, wherein the conductive circumferential case element may be polygonal.

Example 38 may include the apparatus of any of examples 34-37, wherein the elongate segment over which the coupling device is electrically coupled to provide the ground reference to the conductive circumferential case element may provide at least one segment of the conductive circumferential case element that does not receive the ground reference and may have a length that may correspond to a wavelength that is cooperative with transmissive communication by the mobile device.

Example 39 may include the apparatus of any of examples 34-37, wherein the elongate segment over which the coupling device is electrically coupled to provide the ground reference to the circumferential case element may provide first and second segments that not receive the ground reference and that each have a length that corresponds to a wavelength that is cooperative with transmissive communication by the mobile device.

Example 40 may include the apparatus of any of examples 34-37, wherein the circuitry may be covered by an electromagnetic shield to be coupled to the ground reference and the coupling device may be electrically coupled to the electromagnetic shield to receive the ground reference.

Example 41 may include the apparatus of any of examples 34-37, wherein the apparatus may be a wearable device or a portable device.

Example 42 may include a system, which may comprise: transmissive communication means to provide transmissive communication via an antenna element; housing means to house the transmissive communication means and the antenna element, the housing means including a conductive case element; transmissive boost means electrically associated with the transmissive communication means and the conductive case element of the housing means to boost efficiency of the transmissive communication.

Example 43 may include the system of example 42, wherein the conductive case element may be elongate and the transmissive boost means may include means to provide a ground reference to an elongate segment of the conductive case element.

Example 44 may include the system of example 43, wherein the conductive case element may include a circumferential configuration.

Example 45 may include the system of example 44, wherein the means to provide the ground reference to an elongate segment of the conductive case element further may provide at least one current segment of the conductive circumferential case element with a length that corresponds to a wavelength that is cooperative with transmissive communication by the mobile device, wherein the at least one current segment may not receive the ground reference.

Example 46 may include the system of any of examples 42-45, wherein the ground reference is a circuit ground.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A mobile device, comprising:
   a circuit board;
   circuitry for transmissive communication, mounted on the circuit board;
   an antenna element mounted on the circuit board, in communication with the circuitry to transmit or receive transmissive communication;
   an electromagnetic shield that covers the circuitry for transmissive communication, but not the antenna element;
   a housing that houses the circuit board with the circuitry for transmissive communication and the antenna element, and that includes a conductive housing element having an elongate segment; and
   a coupling device, housed by the housing and external to the electromagnetic shield, electrically coupled to the electromagnetic shield and to a radiation path of the antenna element, as well as coupled to the elongate segment of the conductive housing element.

2. The mobile device of claim 1, wherein the conductive housing element includes a circumferential case element connected to peripheral edges of a case top and a case bottom.

3. The mobile device of claim 2, wherein the case top and the case bottom are nonconductive.

4. The mobile device of claim 2, wherein the circumferential case element forms a closed loop around the peripheral edges of the case top and the case bottom.

5. The mobile device of claim 2, wherein the elongate segment has a length that corresponds to a wavelength that is cooperative with transmissive communication by the mobile device.

6. The mobile device of claim 2, wherein the elongate segment includes first and second segments with a length that corresponds to a wavelength that is cooperative with transmissive communication by the mobile device.

7. The mobile device of claim 1, wherein the mobile device is a wearable device or a portable device.

8. The mobile device of claim 1, wherein the mobile device is an Internet of Things (IoT) device.

9. An apparatus, comprising:
   circuitry for transmissive communication mounted on a circuit board;
   an antenna element mounted on the circuit board and in communication with the circuitry to transmit or receive transmissive communication;
   an electromagnetic shield that covers the circuitry for transmissive communication, but not the antenna element;
   a housing that houses the circuit board with the circuitry for transmissive communication and the antenna element, and that includes a conductive circumferential case element having an elongate segment; and
   a coupling device, housed by the housing and external to the electromagnetic shield, electrically coupled to the electromagnetic shield and to a radiation path of the antenna element, as well as coupled to the elongate segment of a conductive housing element.

10. The apparatus of claim 9, wherein the conductive circumferential case element forms a closed housing circumference.

11. The apparatus of claim 10, wherein the conductive circumferential case element provides external housing.

12. The apparatus of claim 9, wherein the conductive circumferential case element is polygonal.

13. The apparatus of claim 9, wherein the elongate segment has a length that corresponds to a wavelength that is cooperative with transmissive communication by the mobile device.

14. The apparatus of claim 9, wherein the elongate segment includes first and second segments with a length that corresponds to a wavelength that is cooperative with transmissive communication by the mobile device.

15. The apparatus of claim 9, wherein the apparatus is a wearable device or a portable device.

16. A system, comprising:
   a circuit board;
   circuitry to provide transmissive mounted on the circuit board;

an antenna element mounted on the circuit board, in communication with the circuitry to transmit or receive transmissive communication;

an electromagnetic shield that covers the circuitry for transmissive communication, but not the antenna element;

a housing to house the circuit board with the circuitry for transmissive communication and the antenna element, the housing including a conductive case element having an elongate segment;

a transmissive booster, housed by the housing and external to the electromagnetic shield, electrically coupled to the electromagnetic shield and to a radiation path of the antenna element, as well as coupled to the elongate segment of the conductive case element to boost efficiency of the transmissive communication.

17. The system of claim 16, wherein the conductive case element includes a circumferential configuration.

18. The system of claim 17, wherein the conductive circumferential case element has a length that corresponds to a wavelength that is cooperative with transmissive communication by a mobile device.

* * * * *

UNITED STATES PATENT AND TRADEMARK OFFICE
CERTIFICATE OF CORRECTION

PATENT NO. : 10,461,402 B2
APPLICATION NO. : 15/428010
DATED : October 29, 2019
INVENTOR(S) : Aycan Erentok et al.

Page 1 of 1

It is certified that error appears in the above-identified patent and that said Letters Patent is hereby corrected as shown below:

In the Claims

Column 12
Line 66, "transmissive mounted..." should read – "transmissive communication, mounted..."

Signed and Sealed this
Seventeenth Day of December, 2019

Andrei Iancu
*Director of the United States Patent and Trademark Office*